Patented Sept. 16, 1930

1,775,985

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

TRIPHENYL METHYL ESTERS OF DIALKYL CARBAMIC ACIDS AND PROCESS OF PREPARING THE SAME

No Drawing.   Application filed November 8, 1928.   Serial No. 318,104.

This invention relates to new chemical substances, triphenyl methyl disubstituted dithiocarbamates, and to a method of making them.

One of these compounds triphenyl methyl diethyl dithiocarbamate may be prepared in the following manner:

29.2 grams of diethylamine and 12 cc. of carbon disulphide are mixed in 200 cc. of chloroform. This mixing forms diethyl ammonium diethyldithiocarbamate. To the chloroform solution of the diethyl ammonium diethyl dithiocarbamate are added 27.85 grams of triphenylchlor methane, and the mixture is heated under reflux condenser at the boiling point of chloroform until substantially all the triphenyl chlormethane has gone into solution and the reaction completed. On cooling, the major part of the product, the triphenylmethyldiethyldithiocarbamate, crystallizes out. On filtering, and washing with water, the pure ester is obtained. It melts at 153° C.; it is fairly soluble in hot alcohol, and less soluble in cold alcohol or chloroform. The formula of this compound is believed to be

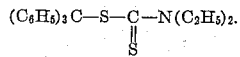

The same procedure may be employed in making other dialkyl derivatives and if desired the compounds may be made directly from a solution of a dialkyl dithiocarbamate salt instead of forming this reaction product as described in the foregoing procedure.

These compounds may be used for the acceleration of the vulcanization of rubber.

Having thus described my invention, what I claim and desire to protect by Letters Patent is:

1. As new compounds the triphenylmethyl dialkyl dithiocarbamates.

2. As new compounds triphenyl methyl diethyl dithiocarbamates.

3. The method of making triphenyl methyl esters of dialkyl dithiocarbamic acids which comprises treating a solution of a metallo salt of a dialkyl dithiocarbamic acid with triphenyl chlormethane, heating until the reaction is completed, cooling, and separating the triphenyl methyl dialkyl dithiocarbamate from the reaction mixture.

4. The method of making triphenyl methyl ester of diethyl dithiocarbamic acid which comprises treating a solution of a metallo salt of diethyl dithiocarbamic acid with triphenyl chlormethane, heating until the reaction is completed, cooling, and separating the triphenylmethyl diethyldithiocarbamate from the reaction mixture.

5. The method of making triphenyl methyl esters of dialkyl dithiocarbamic acids which comprises treating a solution of a metallo salt of a dialkyl dithiocarbamic acid with triphenyl chlormethane, heating until the reaction is completed, cooling, separating and purifying the reaction product, triphenyl methyl dialkyl dithiocarbamate.

6. The method of making triphenyl methyl ester of diethyl dithiocarbamic acid which comprises treating a solution of a metallo salt of diethyl dithiocarbamic acid with triphenyl chlormethane, heating until the reaction is completed, cooling, separating and purifying the reaction product, triphenylmethyl diethyl dithiocarbamate.

Signed at Passaic, county of Passaic, State of New Jersey, this 2nd day of November, 1928.

SIDNEY M. CADWELL.